United States Patent
Sheynblat et al.

(10) Patent No.: US 6,408,196 B2
(45) Date of Patent: *Jun. 18, 2002

(54) METHOD AND APPARATUS FOR PROVIDING RESERVE POWER IN A CELLULAR TELEPHONE

(75) Inventors: Leonid Sheynblat, Belmont; Thomas George Wolf, Mountain View, both of CA (US)

(73) Assignee: SnapTrack, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/921,971

(22) Filed: Aug. 2, 2001

Related U.S. Application Data

(63) Continuation of application No. 09/109,478, filed on Jul. 2, 1998, now Pat. No. 6,314,308.

(51) Int. Cl.$^7$ .................... H04B 1/38; H04M 11/00
(52) U.S. Cl. .................. 455/574; 455/404; 455/521; 455/456; 342/357.1
(58) Field of Search ................ 455/574, 575, 455/521, 404, 456, 414; 342/357.1

(56) References Cited

U.S. PATENT DOCUMENTS

| | | | |
|---|---|---|---|
| 4,868,832 A | | 9/1989 | Marrington et al. .......... 714/22 |
| 5,311,441 A | | 5/1994 | Tayama et al. ............... 702/63 |
| 5,594,951 A | * | 1/1997 | Bellin ......................... 455/127 |
| 5,598,460 A | * | 1/1997 | Tendler ........................ 379/37 |
| 5,604,708 A | | 2/1997 | Helms et al. ............... 365/229 |
| 5,640,081 A | | 6/1997 | Austin et al. ............... 320/127 |
| 5,663,734 A | | 9/1997 | Krasner ................. 342/357.12 |
| 5,714,870 A | * | 2/1998 | Dunstan ..................... 713/321 |
| 5,883,594 A | * | 3/1999 | Lau ......................... 342/357.1 |
| 5,953,677 A | * | 9/1999 | Sato .......................... 455/574 |
| 6,314,308 B1 | * | 11/2001 | Sheynblat et al. .......... 455/574 |

OTHER PUBLICATIONS

Dell® Inspiron 3000: Reference and Troubleshooting Guide, Dell Computer Corporation (Sep. 1997), pp. 1–3, 2–8, 2–9, 2–13, and 2–14 (document is 7 pgs total).

* cited by examiner

Primary Examiner—William Trost
Assistant Examiner—Rafael Perez-Gutierrez
(74) Attorney, Agent, or Firm—Blakely, Sokoloff, Taylor & Zafman, LLP

(57) ABSTRACT

Reserve power is provided in a portable cellular transceiver comprising a Global Positioning System (GPS) receiver by monitoring a power level of a battery of the portable cellular transceiver using a power detection circuit. A comparator circuit determines whether the power level of the battery is greater than a predetermined threshold. Based on the available power level, a power control circuit automatically places the transceiver into at least one low power mode when the power level reaches a corresponding threshold level. The low power mode selectively powers down circuitry of the portable cellular transceiver. The corresponding threshold level reserves power for an emergency telephone call. Power is provided to the circuitry of the portable cellular transceiver when the available power level is greater than the predetermined threshold. The reserve power provides power for the activation of the portable cellular transceiver, establishment of a call between the portable cellular transceiver and a cellular base station, transfer of GPS satellite acquisition aiding information to the portable cellular transceiver, receipt of GPS satellite information, communication of GPS satellite information to the cellular base station, and determination of a position of the portable cellular transceiver. The emergency telephone call may be a single button enhanced 911 call.

6 Claims, 2 Drawing Sheets

METHOD AND APPARATUS FOR PROVIDING RESERVE POWER IN A CELLULAR TELEPHONE

This application is a continuation of U.S. patent application Ser. No. 09/109,478, filed Jul. 2, 1998, now U.S. Pat. No. 6,314,308 B1.

FIELD OF THE INVENTION

This invention relates to cellular telephones that integrate Global Positioning System (GPS) receivers. More particularly, this invention relates to power management in a cellular telephone.

BACKGROUND OF THE INVENTION

GPS receiver systems are becoming prevalent among consumers as the GPS system cost decreases and technology allows for the miniaturization of these systems. The popularity of these systems is in large part due to their ability to provide highly accurate position information at a very low cost using a hand-held unit that is small enough to fit in a briefcase or a purse. As a result of this popularity, GPS receiver systems are being integrated into other electronic systems, for example, cellular telephone systems. In this manner, the GPS portion of the electronic system is able to simultaneously provide the position of the cellular telephone user to the user and/or a party that is being communicated with using the integrated cellular telephone. This type of system is typically useful to, but not limited to, emergency services personnel that need to quickly identify the location of a caller, such as an enhanced 911 system.

With regard to electronic systems having integrated GPS systems, emphasis has been placed on the handheld cellular telephone systems because of their prevalent use in society. With the cellular telephone, the battery life of the telephone has a significant impact on the acceptance of a particular model of phone by consumers. Therefore, as the integration of a GPS receiver into a cellular telephone device is likely to increase the power consumption of the telephone device, the telephone designer must focus particular effort on decreasing the power requirements of the integrated telephone device so as to increase the operating time of the device and maximize the availability of the device to a user.

One of the main reasons for the acquisition of a cellular telephone is for use in emergency situations encountered by the user. However, when the cellular telephone is allowed to be used until the battery is dead, the cellular telephone becomes unavailable for emergency use. Prior art cellular telephones fail to automatically provide the reservation of enough power in a cellular telephone battery to allow a 911 emergency call to be placed by the user.

One prior art technique used to provide reserve battery power in other types of portable electronic devices, for example, portable personal computers, is to provide a separate battery for reserve use only. The problem with the use of a spare battery is that, while providing enough power to allow the user to perform a save to the memory before a complete power loss, the battery increases the size and weight of the portable computer.

Another prior art power reservation technique used in portable personal computers is to provide a save-to-disk suspend mode that prevents data loss when the batteries run out of power by copying all system data to a disk drive and turning the computer off. However, prior art cellular telephone systems do not provide an equivalent feature. Thus, the prior art integrated cellular telephone lacks the automatic provision of reserve power for use in placing emergency calls with the cellular telephone.

SUMMARY OF THE INVENTION

A method and an apparatus for providing reserve power in a cellular telephone are provided. In one embodiment, reserve power is provided in a portable cellular transceiver comprising a Global Positioning System (GPS) receiver by monitoring, continuously or periodically, a power level of a battery of the portable cellular transceiver. A determination is made as to whether the power level of the battery is greater than a predetermined threshold. Based on the available power level, the portable cellular transceiver is automatically placed into at least one low power mode when the power level reaches a corresponding threshold level. The low power mode may be a shut-off mode which selectively powers down circuitry of the portable cellular transceiver. The corresponding threshold level reserves power for an emergency telephone call. Power is provided to the circuitry of the portable cellular transceiver when the available power level is greater than the predetermined threshold. The reserve power provides power for the activation of the portable cellular transceiver, establishment of a call between the portable cellular transceiver and a cellular base station, transfer of GPS satellite acquisition aiding information to the portable cellular transceiver, receipt of GPS signals, and communication of GPS satellite information (e.g. pseudoranges or a position) to the cellular base station, and, optionally, determination of a position of the portable cellular transceiver.

In an embodiment, the emergency telephone call may be an enhanced 911 call. The emergency telephone call may be a single button call, wherein activation of a single button of the portable cellular transceiver causes the selective application of power to GPS receiver circuitry and selective application of power to communication circuitry. The emergency message may comprise voice data, alphanumeric message data, or some combination of voice and alphanumeric message data.

In an embodiment, the portable cellular transceiver comprises a power detection circuit for monitoring a power level of a battery of the portable cellular transceiver. While the monitoring may be continuous, it may be on a regular basis, a scheduled basis, a predetermined basis, or based on the mode of operation (i.e., stand-by mode or during a phone call). Furthermore, the portable cellular transceiver comprises a power control circuit for automatically placing the portable cellular transceiver into at least one shut-off mode when the power level reaches at least one threshold level. Moreover, the portable cellular transceiver comprises a comparator circuit for determining if a power level of the battery is greater than a predetermined threshold, wherein the power control circuit provides power to at least one circuit of the portable cellular transceiver when the power level is greater than a predetermined threshold.

These and other features, aspects, and advantages of the present invention will be apparent from the accompanying drawings. and from the detailed description and appended claims which follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
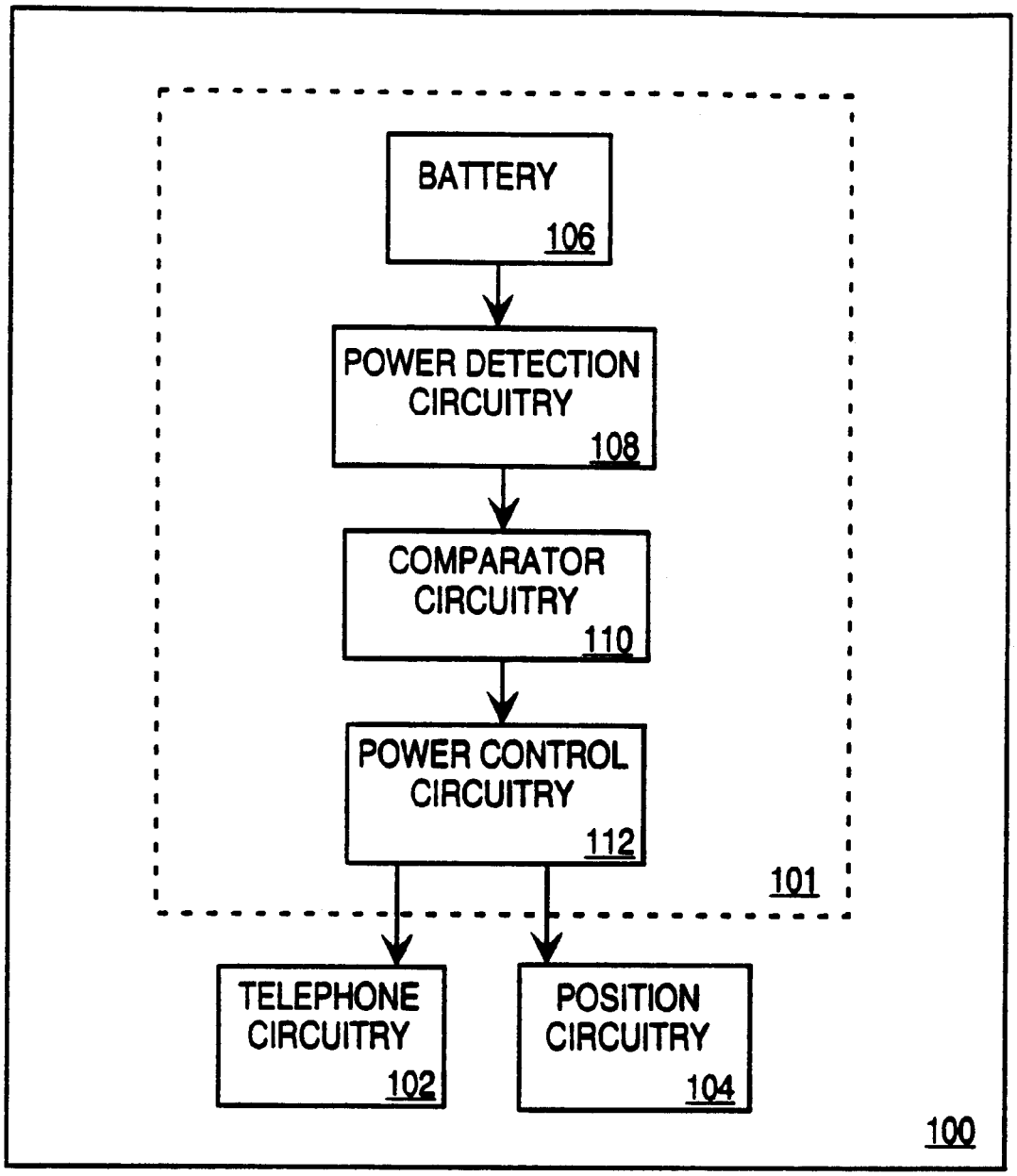
FIG. 1 is a block diagram of an integrated cellular telephone of one embodiment.

A method and an apparatus for providing reserve power in a cellular telephone are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention. One example of a GPS receiver to be used with the present invention described herein is found in U.S. Pat. No. 5,663,734 by Norman F. Krasner.

A method and an apparatus is described herein for providing reserve power in a portable communication device. The portable communication device of one embodiment is a cellular telephone, sometimes also referred to as a cell telephone or personal communication system (PCS). The portable communication device may comprise a satellite communication handset, but the embodiment is not so limited. In one embodiment, reserve power is provided in a portable cellular transceiver comprising a satellite positioning system (SPS) receiver by monitoring a power level of a battery of the portable cellular transceiver using a power detection circuit. The satellite positioning system receiver may be a Global Positioning System (GPS) receiver, but the embodiment is not so limited. A comparator circuit determines whether the power level of the battery is greater than a predetermined threshold. Based on the available power level, a power control circuit automatically places the transceiver into at least one low power mode, or shut-off mode, when the power level reaches a corresponding threshold level. In one embodiment, the power control circuit may cause to be displayed a percentage of power remaining. In one embodiment, the power control circuit may predict and cause to be displayed a time remaining until the telephone is placed into a low power mode. In one embodiment, the power control circuit may predict and cause to be displayed a time that the telephone will be placed into a low power mode. The predicted time may be in GPS time, or in Universal Time Coordinate (UTC) time, but the embodiment is not so limited.

The low power mode selectively powers down circuitry of the portable cellular transceiver. Alternatively, the low power mode disables selected capabilities of the cellular transceiver based on a prespecified hierarchy. The corresponding threshold level reserves power for an emergency telephone call. Power is provided to the circuitry of the portable cellular transceiver when the available power level is greater than the predetermined threshold. The reserve power provides power for the activation of the portable cellular transceiver, establishment of a call between the portable cellular transceiver and a cellular base station, transfer of GPS satellite acquisition aiding information to the portable cellular transceiver, receipt of GPS satellite information, communication of GPS satellite information to the cellular base station, and determination of a position of the portable cellular transceiver. Alternatively, the portable cellular transceiver may not require any GPS satellite acquisition aiding information. The GPS satellite information may comprise GPS pseudorange information, digitized signals from which GPS pseudorange information can be determined, and latitude and longitude information, but the embodiment is not so limited. The emergency telephone call may be a single button enhanced 911 call.

FIG. 1 is a block diagram of an integrated cellular telephone 100 of one embodiment. The cellular telephone 100 comprises telephone circuitry 102, position circuitry 104, and power management circuitry 101. The power management circuitry 101 comprises a battery 106, power detection circuitry 108, comparator circuitry 110, and power control circuitry 112. The battery 106 provides power to circuits of the cellular telephone 100. The power detection circuitry 108 monitors a power level of the battery 106. While the monitoring may be continuous, it may be on a regular basis, a scheduled basis, a predetermined basis, or based on the mode of operation (i.e., stand-by mode or during a phone call). The comparator circuitry 110 determines whether a power level of the battery 106 is greater than a predetermined threshold. In one embodiment, the comparator circuitry 110 may provide a quantitative measurement of the power level of the battery 106, but the embodiment is not so limited. The power control circuitry 112 controls application of power from the battery 106 to the telephone circuitry 102 and position circuitry 104 based on the available battery power. In one embodiment, the telephone circuitry 102 and the position circuitry 104 comprise shared circuitry.

The power control circuitry 112 automatically places the portable cellular telephone 100 into at least one low power mode when the battery power level reaches at least one threshold level. One or more low power modes may selectively power certain components of the cellular telephone 100, thereby selectively enabling functions of the cellular telephone 100, but the embodiment is not so limited. One low power mode selectively disables circuitry of the cellular telephone 100, thereby allowing for a threshold power level that reserves enough power to allow a user to place at least one emergency telephone call. The low power mode may disable selected capabilities of the cellular transceiver based on a prespecified hierarchy, but the embodiment is not so limited.

In an alternate embodiment, the power management circuitry may comprise an auxiliary battery for use in placing emergency telephone calls. In this alternate embodiment, the power control circuitry allows the cellular transceiver to be used until the main battery is drained. At such time as an emergency call is activated, the power control circuit provides power to the telephone circuitry and the position circuitry from the separate battery.

In one embodiment, the emergency telephone call may comprise a call to a 911 operator, but the embodiment is not so limited. In placing the emergency telephone call, the power control circuitry 112 provides power to the telephone circuitry 102 and the position circuitry 104 of the portable cellular telephone 100 when the power level is greater than a predetermined threshold. In one embodiment, the position circuitry 104 comprises a GPS receiver, but the embodiment is not so limited. In one embodiment, the position circuitry 104 determines the actual position of the cellular telephone 100, in latitude and longitude, and the telephone circuitry 102 transmits the position along with an emergency message to an emergency operator. In an alternate embodiment, the position circuitry 104 determines pseudoranges of the cellular telephone 100, and the telephone circuitry 102 transmits the pseudoranges along with an emergency message to a cellular base station or an emergency operator. In another alternate embodiment, the position circuitry 104 provides digitized signals from which pseudoranges of the cellular telephone 100 can be determined, and the telephone circuitry 102 transmits the digitized signals along with an emergency message to a cellular base station or an emergency operator. The use of position overlay information-nay be incorporated in which the position circuitry 104 uses information overlaid with the communication signals to determine the position of the cellular telephone 100. The overlay information may comprise the pseudorange, time of arrival, or other timing information derived from the communication signals.

In yet another embodiment, the power control circuitry 112 only provides power to the telephone circuitry 102 to allow the emergency telephone call to be placed. In this embodiment, the reserve power allows for activation of the portable cellular telephone. A high power call is established between the portable cellular telephone and at least three cellular base stations. The three cellular base stations determine the location of the portable cellular telephone using a network overlay approach. The network overlay approach provides for a determination of the location of the portable cellular telephone using a time of arrival of the signal at the at least three cellular base stations, but the embodiment is not so limited.

In one embodiment, a single button of the portable cellular telephone 100 may provide the emergency telephone call. Activation of the single button results in selective application of power to the telephone circuitry 102 and the position circuitry 104. In one embodiment, the position circuitry 104 determines a position of the portable cellular telephone 100. In an alternate embodiment, the position circuitry 104 provides signals from which the position of the portable cellular telephone 100 can be determined. The telephone, or communication,. circuitry 102 transmits a position of the portable cellular telephone 100 along with an emergency message to an emergency operator. The emergency message may comprise identification and position of a user, but the embodiment is not so limited.

While a user may make an emergency call with the cellular telephone by dialing the sequence "9"-"1"-"1", the emergency telephone call of one embodiment may be a single button enhanced 911 call, but the embodiment is not so limited. The enhanced 911 call activates a minimum sub-set of circuitry in the cellular telephone that is used to make an emergency call. When using the enhanced 911 call, the activation of a single button enables the reserve power, and the enabled reserve power provides power for activation of the telephone circuitry 102 and the position circuitry 104 of the cellular telephone 100. The single emergency button may be activated in the middle of an existing telephone call, in which case the telephone circuitry 102 and the position circuitry 104 may already be provided with power.

Upon activation of the single emergency button, a call is established between the portable cellular telephone 100 and a cellular base station. Global Positioning System satellite acquisition aiding information may be transferred to the portable cellular telephone 100. The GPS satellite information is received at the cellular telephone, and the GPS satellite information is communicated to the cellular base station. In one embodiment, positioning information can also be derived from communication signals using a cellular telephone overlay approach. Other alternative location determining systems (e.g. Loran) may also be used, and the mobile unit may determine its own position or may be assisted by a location assistance system such as a location server. In one embodiment, a position of the portable cellular telephone 100 is determined using circuitry of the cellular base station. In one embodiment, a position of the portable cellular telephone 100 may be determined using circuitry of the cellular telephone 100, wherein the position is communicated to the cellular base station along with an emergency message, but the embodiment is not so limited.

Figure 2:
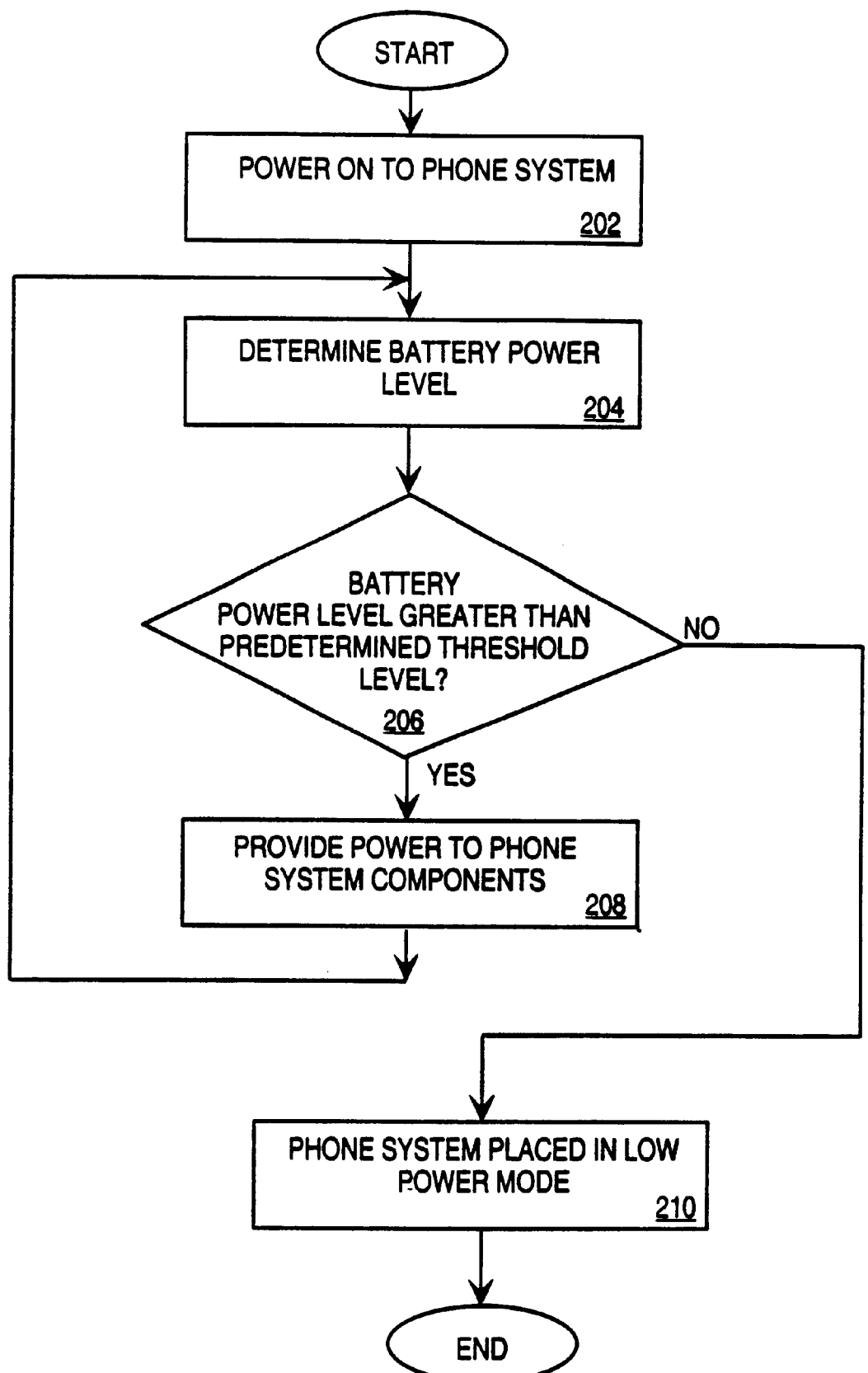
FIG. 2 is a flowchart for providing reserve power in a portable cellular transceiver or telephone of one embodiment.

FIG. 2 is a flowchart for providing reserve power in a portable cellular transceiver or telephone of one embodiment. In one embodiment, the cellular telephone comprises a GPS receiver, but the embodiment is not so limited. In one embodiment, the cellular telephone comprises circuitry for determining a position of the cellular telephone, but the embodiment is not so limited. Operation begins at step 202, at which power is activated to the cellular telephone. Upon activation of power to the cellular telephone monitoring of the power level of the battery commences. The power level of the cellular telephone battery is monitored and, at step 204, the power level of the battery is determined. At step 206, a determination is made as to whether the power level of the battery is greater than a predetermined threshold. If the battery power level is greater than a predetermined threshold, battery power is provided to the components of the cellular telephone, at step 208.

The determination as to whether the battery power level is greater than a predetermined threshold may comprise a quantitative determination of the battery power level. The quantity measured may comprise maximum voltage level, change in voltage, and a combination of maximum voltage and change in voltage, but the embodiment is not so limited. The quantified battery power level may be used in a determination as to what particular circuitry or what particular functions of the cellular telephone are to be activated, but the embodiment is not so limited. Following the provision of power to the component circuitry of the cellular telephone, at step 208, operation continues by repeating steps 204, 206, and 208, wherein the power level of the battery is monitored while the cellular telephone is turned on.

If the battery power level is determined to be less than a predetermined threshold, at step 206, the cellular telephone, at step 210, is placed in a low power mode. In one embodiment, there may be more than one low power mode, but the embodiment is not so limited. For example, a low power mode may provide a first threshold level that provides enough power to send and receive calls having a limited duration. Another low power mode may provide a second threshold level that provides only enough power to initiate a call by selectively activating specific circuitry in the cellular telephone. Another low power mode may provide a third threshold level that provides only enough power to receive a call by selectively activating specific circuitry in the cellular telephone. Another low power mode may provide a fourth threshold level that reserves power for at least one emergency telephone call. This low power mode selectively powers down circuitry of the cellular telephone, thereby providing an improvement in the cellular telephone design that results in increased availability of the cellular telephone in response to emergency situations.

In one embodiment, the emergency telephone call is an enhanced 911 call. For the enhanced 911 call, the reserve power allocated allows for activation of the cellular telephone. In one embodiment, the activation comprises enablement of the circuitry necessary to determine the position of the cellular telephone and to complete an emergency call, but the embodiment is not so limited. Upon activation, a call is established between the cellular telephone and a cellular base station. When the call is established, GPS satellite acquisition aiding information may be transferred to the cellular telephone. After receipt of the GPS satellite acquisition information, GPS satellite information is communicated to the cellular base station. The GPS satellite information is used to determine a position of the cellular telephone, but the embodiment is not so limited. In one embodiment, the GPS satellite information comprises the position of the cellular telephone.

In one embodiment, the emergency telephone call is a single button call, wherein one button of the cellular telephone enables the emergency telephone call. When a single button of the cellular telephone provides the at least one emergency telephone call, the activation of the single button results in selective application of power to the GPS receiver circuitry of the cellular telephone. The GPS receiver circuitry determines a position information of the cellular telephone. Moreover, activation of the single button results in selective application of power to telephone or communication circuitry. The telephone circuitry transmits the position information of the cellular telephone along with an emergency message to an emergency operator. In one embodiment, the emergency message comprises voice data. In an alternate embodiment, the emergency message comprises an alphanumeric message, the alphanumeric message comprising the identification and location information of the user. In another alternate embodiment, the emergency message comprises voice data and alphanumeric data, where the alphanumeric data comprises position information of the user.

Thus, a method and an apparatus for providing reserve power in a cellular telephone have been provided. Although the present invention has been described with reference to specific exemplary embodiments, it will be evident that various modifications and changes may be made to these embodiments without departing from the broader spirit and scope of the invention as set forth in the claims. Although the methods and apparatus of the present invention have been described with reference to GPS satellites and GPS signals, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band or other carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites.

In the preceding discussion the invention has been described with reference to application upon the United States Global Positioning Satellite (GPS) system. It should be evident, however, that these methods are equally applicable to similar satellite positioning systems, and in particular, the Russian Glonass system. The term "GPS" used herein includes such alternative satellite positioning systems, including the Russian Glonass system. Accordingly, the specification and drawings are to be regarded in an illustrative rather than a restrictive sense.

What is claimed is:

1. A method for providing reserve power in a portable cellular transceiver comprising a Global Positioning System (GPS) receiver, the method comprising:

monitoring a power level of a battery of the portable cellular transceiver; and automatically placing the portable cellular transceiver into at least one low power mode when the power level reaches at least one threshold level, wherein the at least one threshold level reserves power for at least one emergency telephone call, wherein the at least one emergency telephone call is an enhanced 911 call, wherein the reserve power allows for:

activation of the portable cellular transceiver;

establishment of a call between the portable cellular transceiver and a cellular base station;

transfer of GPS satellite acquisition aiding information to the portable cellular transceiver;

receipt of GPS signals; and communication of GPS satellite information to the cellular base station.

2. A method for providing reserve power in a portable cellular transceiver comprising a Global Positioning System (GPS) receiver, the method comprising:

monitoring a power level of a battery of the portable cellular transceiver; and automatically placing the portable cellular transceiver into at least one low power mode when the power level reaches at least one threshold level, wherein the at least one threshold level reserves power for at least one emergency telephone call, wherein the automatically placing of the portable cellular transceiver into at least one low power mode comprises selectively powering down circuitry of the portable cellular transceiver.

3. A method as in claim 2 wherein said at least one threshold level also reserves power to perform a position location function.

4. A method as in claim 3 wherein said position location function comprises determining a time associated with a signal between said portable cellular transceiver and a cellular basestation.

5. A method as in claim 3 wherein said position location function comprises receiving Global Positioning System (GPS) signals.

6. A method as in claim 3 wherein said emergency telephone call comprises an enhanced 911 call.

* * * * *